Aug. 24, 1965    A. J. MASELLA ETAL    3,202,201

GAS BURNER FOR MELTING AND REFINING SCRAP METAL

Filed Jan. 15, 1962

INVENTORS
Anthony J. Masella
Richard K. Matuschkovitz

By
ATTORNEY

United States Patent Office 3,202,201
Patented Aug. 24, 1965

3,202,201
GAS BURNER FOR MELTING AND REFINING SCRAP METAL
Anthony J. Masella, Melrose Park, and Richard K. Matuschkovitz, Chicago, Ill., assignors to Chemetron Corporation, Chicago, Ill., a corporation of Delaware
Filed Jan. 15, 1962, Ser. No. 166,175
11 Claims. (Cl. 158—109)

This invention relates in general to an apparatus for melting and refining scrap metals, and more particularly to an apparatus the use of which results in a reduction in melting time, an increase in furnace production, a more direction control of the metal composition and other savings in the production of refined metals in furnace operations. The apparatus for refining metals comprises a combination burner and lance or injector forming an integral unit adapted for scrap melting, scrap cutting, and decarbonization or refining of molten metal in furnaces.

In the production of steel and other metals in electric, open hearth, and other types of reverberatory furnaces it has been necessary heretofore to utilize various types of equipment for injecting fluids such as fuel gas, and oxygen into the furnace. Conventionally, this equipment is a burner or a lance, independently. The burner is usually employed to supplement the source of heat for the furnace while the lance is used to introduce oxygen for various reasons into the furnace. If both functions are to be performed simultaneously, this ordinarily means that two pieces of apparatus would have to be handled. Further, exposure to the combustion area of the furnace usually results in an objectionably short life of the apparatus. If the equipment is not adapted to come into close contact with the actual melting area the melting time is prolonged, especially when starting with a cold furnace and cold metal scrap.

It is therefore a primary object of this invention to provide a combination burner-lance for injection of fuel gas and oxygen together or oxygen separately into a furnace and in direct contact with the metal melting area for scrap melting, scrap cutting, and decarbonization or refining in melting furnaces singly or simultaneously, into a furnace, the burner-lance being so constructed that a continuous supply of cooling water is circulated around the inner walls of the injector head of the burner-lance, where exposure to the heat is most critical and the cooling need is most acute, to therefore prolong the useful life of the injector head portion.

It is still a further object to provide a combination burner-lance that is sufficiently maneuverable to enable the burner-lance to be directed at selected angles and to desired locations within the furnace, to ensure against "cold spots" and to increase productivity by faster melting by supplementing or substituting for conventional heating means.

It is still another object of this invention to provide a combination burner-lance for injection into an electric furnace whereby an oxy-gas flame capable of a high heating rate can be used to aid the electric arc melting, or replace it if necessary, for uninterruptedly supplying the necessary heat for the processing of the metal.

It is still another object of this invention to provide a combination burner-lance having a plurality of interrelated conduits concentrically disposed to form independent passageways and chambers for passage of cooling water, fuel gases, such as natural gas, and a first and second supply of oxygen towards an integral injection head.

Other objects and advantages of this invention will become more apparent as the following description proceeds when taken in conjunction with the accompanying drawings in which.

Briefly stated, the combined burner and lance of the present invention comprises a multichambered body portion terminating in a head portion which is also multichambered serving as a continuation of most of the chambers in the body portion. The body portion has five concentrically positioned chambers. The head portion has an end wall closing the third, fourth and fifth chambers and defines a common nozzle for the central and second chamber. A plurality of outwardly angled nozzles extend through the end wall of the head portion and communicate with the fourth chamber. Within the head portion are hollow passage means surrounding the angled nozzles and providing communication between the third and fifth chambers. Water inlet and outlet means are laterally connected to these third and fifth chambers to cool the head portion containing the common nozzle and the outwardly angled nozzles. Oxygen inlet means are connected to the central chamber opposite the head portion and laterally to the fourth chamber to supply the angled nozzles. Natural gas inlet means communicate with the second chamber opposite the head portion to be discharged through the common nozzle with oxygen from the central chamber.

Figure 1:
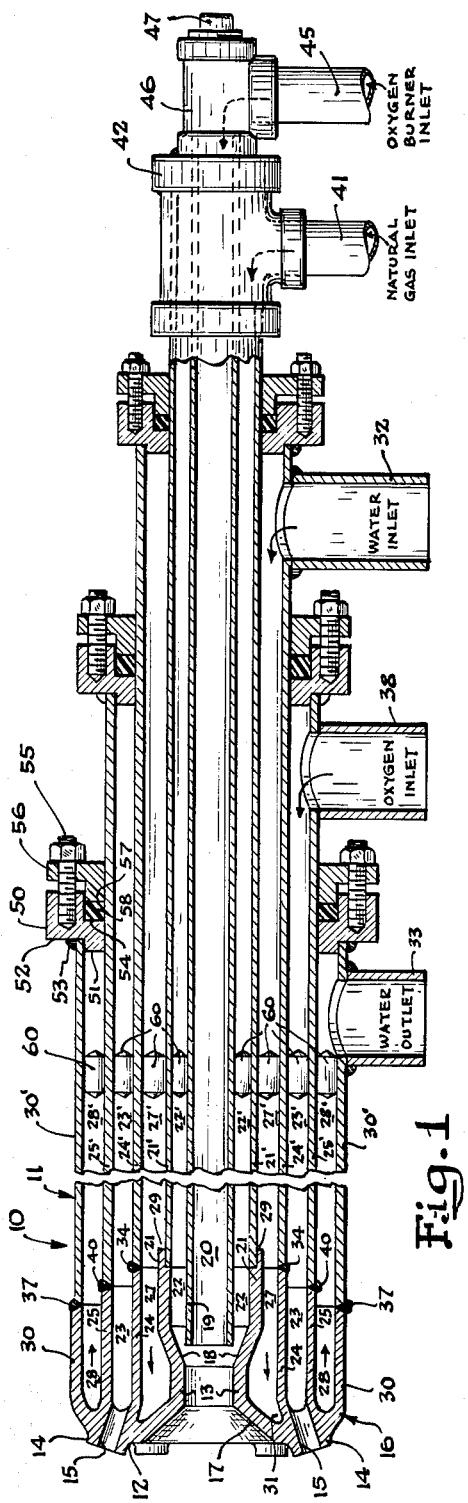
FIG. 1 is a sectional view through the longitudinal center of the combination burner-lance.
Figure 2:
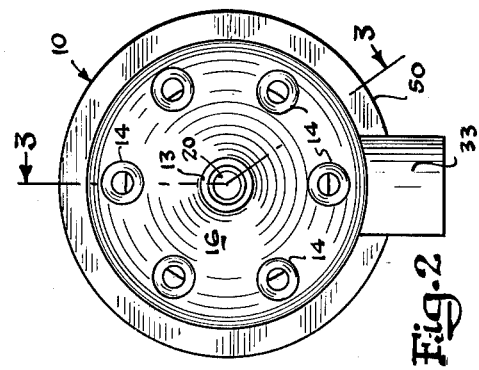
FIG. 2 is an end view at the discharge end of the combination burner-lance.

The combined burner-lance 10 is illustrated in FIG. 1, and has a generally cylindrically shaped body portion 11 and head portion 16. The injector head portion 16 is preferably of cast copper and chilled, defining an end or front wall 12 where passageways or chambers terminate, and openings are provided for discharging a mixture of oxygen and fuel gas hereinafter referred to as oxy-gas. A face 17 tapered rearwardly from, and being an extension of head 16, terminates in a central passageway to define a recessed nozzle 13, to form a diverging outlet for the discharge of an oxy-gas flame outwardly from head portion 16. Nozzle 13, which defines the smallest diametrical object along the central axis of the injector 10 at the head 16, has a tapered wall portion extending from the small diameter nozzle to form a tapered chamber 18 where separate supplies of oxygen and fuel gas converge, are intermixed, and discharged together through nozzle 13 for combustion into an oxy-gas flame starting at the outer tip of nozzle 13. An elongated conduit 19 lying rearwardly of, concentric with and approximately along the same plane as nozzle 13, defines a central chamber 20 for supplying and passing oxygen, having its front open end terminating midway within the mixing chamber 18. A wall 21 along with wall 19 defines a second concentric annular chamber 22 and is an extension of nozzle 13 having a diameter larger than, and concentric wtih central chamber 19. It is utilized for supplying and passing a gaseous fluid, such as natural gas, for mixture with the oxygen, and consequently into an oxy-fuel gas flame. Nozzle 13 is therefore in effect, a common nozzle for both central chamber 19 and annular chamber 22.

The mixing chamber 13 is designed with a constricted flow path relative to the gas chamber 22 that the discharge of oxygen at high pressure from chamber 20 tends to suck or draw the gas being discharged from chamber 22. This latter provides a more efficient combustion and a novel flame characteristic at the tip of nozzle 13. This sucking or drawing effect also prevents flashback in chamber 22 and the damaging consequences that could conceivably occur. Also, the flame resulting at the tip of nozzle 13 is somewhat cone-shaped, thus providing a more centralized heat at the head of the injector. In some oxy-gas burners heretofore known, the actual mixing of the two gases takes places in the rear, remote from the discharge end, inviting the possibility of flashback, while in other types of known oxy-gas burners the mixture takes places a short distance in advance of the head, preventing the head from getting very close to the work so that the flame is not smothered.

Figure 3:
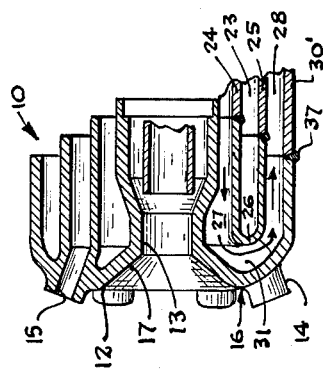
FIG. 3 is a sectional view taken on the line 3—3 of FIG. 2.

A plurality of outwardly angled nozzles 14 have openings 15 communicating with a fourth annular chamber 23 defined by walls 24 and 25, which latter have diameters larger than, but concentric with, conduit 19. In the present design six equally spaced nozzles have been found to work well. Chamber 23 is utilized for supplying and passing oxygen under pressure for discharge from openings 15 in a circular dispersion on a work surface as formed by the ring of angled nozzles 14 on the head 16. The nozzles 14 and more particularly the openings 15 are angled away from the central axis of the injector 10 to discharge the oxygen within a circumferential area not conflicting or overlapping the gas discharge from nozzle 13. Thus, there is no danger of the oxygen discharged from nozzles 14 smothering the flame from nozzle 13 when the head 16 is adjacent a work surface and nozzles 13 and 14 are being utilized simultaneously. It will be noted from observing FIG. 3 that walls 24 and 25 have a front interconnecting wall 26 recessed a short distance from head 16 and serving as an end wall of chamber 23. Wall 26 extends between each nozzle 14, at which latter points the openings 15 are provided for communicating with chamber 23.

A pair of annular chambers 27 and 28 defined by walls 24 and 21, and 25 and 30 respectively, lie concentric with conduit 19. They form the remaining third and fifth chambers respectively, and are utilized for circulating cooling water around adjacent chambers together with the inner walls of the injector head 16. It will be observed from FIGS. 1, 3 and 4 that the innermost water chamber 27 lies in a concentric relation between oxygen chamber 23 and the fuel gas chamber 22, and circulates the cooling water towards head 16 as indicated by the arrow. As mentioned, end wall 26 of chamber 23 is recessed from the head 16 providing a passageway 31 (FIG. 3) for circulating the cooling water from chamber 27 into chamber 28, as illustrated by the arrows. Due to this passageway 31, the cooling water circulates around a portion of the nozzles 14 as best illustrated by the arrows in the distorted perspective view of FIG. 4, to keep these nozzles relatively cool during exposure to the combustion area of a furnace or vessel. It should be pointed out that head 16 and its tapered face 17 have been removed from FIG. 4 to better illustrate this circulation of the cooling water in this area.

It will be noted in FIG. 1 that head portion 16 has a pocket 31 or compartment adjacent nozzle 13 and as an enlargement of chamber 27, for circulating the cooling water around the nozzle permitting this critical area to be maintained relatively cool when the oxy-gas flame is being used. It has been found that this turbulence or sweeping action of the cooling water relative to the head 16 and its adjacent parts, is most effective in extracting heat from this critical area, and suppresses the tendency for steam to form or collect.

In describing the present invention reference has been made to the head portion 16 and the chambers therein defined by the respective walls. With respect to the body portion 11 the same reference numerals are employed with respect to the corresponding chambers and walls, except that they are primed. In the instance of body section 11 the walls are actually pipes. It will be seen from the drawing that central chamber 20 is fabricated from one piece of pipe and is a part of body section 11 while extending into head portion 16 to also form a central chamber therein. Under the present invention and as described in FIG. 1, an inlet pipe 32 for cooling water at a forced rate of about 400–500 gallons per minute, is connected to an elongated water chamber 27' which extends from the cold end of the injector forwardly to the chamber 27. Chamber 27' communicates with chamber 27 by connecting wall 21 to pipe 21' and wall 24 to pipe 24' by means of furnace brazings as illustrated at 29 and 34, respectively. An outlet pipe 33 is connected to chamber 28' and returns circulating cooling water from chamber 27, by way of passageway 31, since it communicates with chamber 28. This communication is made by connecting wall 25 with pipe 25' and wall 30 with pipe 30' by means of furnace brazings 40 and 37, respectively. With the previously referred to connections being made it will be seen that oxygen chamber 23 is connected to oxygen chamber 23' which is supplied by oxygen inlet pipe 38. An inlet pipe 41 for natural gas is connected by a T 42 to elongated gas chamber 22' which extends forwardly to the natural gas chamber 22, being connected thereto also during the connection of the water chambers. Lastly, an oxygen burner inlet pipe 45 for oxygen is connected by a T 46, having one opening capped at 47 which can serve as an opening for steam purging and/or for steam and oxygen injection and the other opening is connected to the elongated oxygen conduit 19. Thus each wall of the body portion 11 is concentrically related and each has a diameter different than the adjacent walls to correspond with the chamber walls of the injector head.

Between each adjacent pipe, for example 30' and 25', 25' and 24', 24' and 21', an interposed stuffing box 50 is secured therebetween in concentric relation thereto to prevent leakage of the contents in these respective pipes, and serves also to maintain a predetermined spacing between adjacent pipes. Each stuffing box 50 includes a spacer flange 51 of a predetermined thickness for insertion at the end of the progressively largest diametrical pipe and resting on the outer surface of the next progressively smaller diametrical pipe, e.g., in the end opening of pipe 30' and resting on pipe 25'. A shoulder 52 in concentric relation with the associated end of the largest diametrical pipe thus abuts against the end of this pipe where a sealing weld 53 seals the largest pipe surface. A portion of each stuffing box 50 extends rearwardly beyond the flange 51 and is recessed at 54 and tapped to receive fastening screws 55. The fastening screws 55 are mounted in openings in a flange 56 of a packing gland clamp having a stub sleeve 57 adapted to mate with the recessed portion 54 of the stuffing box 50. A packing gland 58 is interposed between the recess 54 and the stub sleeves 57, and is adapted to be compressed by tightening the screws 55 to thereby seal off the end of the passageway formed by the largermost pipe. Therefore, each spacer flange 51 interposed between adjacent pipes serves to maintain a predetermined spacing therebetween, while each sealing weld 53 together with the packing gland 58 serves to seal the end of each pipe from leakage. Moreover, under conditions of normal use, the many pipes included in burner-lance 10 tend to expand, and the particular construction of the stuffing boxes enables this to occur freely.

Dependent largely on the particular overall length of the combination burner-lance 10, it may be advantageous to utilize centering spacers between the pipes at various locations, and may take the form of spacer blocks such as 60, FIG. 1, welded or furnace brazed to the walls of adjacent pipes. It should be understood that these spacer blocks 60 are relatively small and would not interfere with the material flowing through the various passageways formed by the pipes, but rather are utilized to support and provide added rigidity to the elongated burner-lance 10, together with providing the proper spacing between each concentrically related pipe.

Considering first the utilization of the combination burner-lance in an ordinary electric furnace (not shown), the burner-lance may be introduced through an open door or through the side of the furnace wall or through the furnace roof. In extra large furnaces or when it may be otherwise advantageous, two or more such combination burner-lances may be introduced at different angles through the side walls of the electric furnace. Of course the main purpose of this combination burner-lance is to have a single unit, which can be used for scrap melting, scrap cutting, and decarbonization or refining in an electric furnace, and thus the combination burner-lance becomes an integral part of a metal melting unit.

The many advantages of utilizing the burner-lance in the electric furnace will be described hereinafter to better illustrate the advantages of the combined burner-lance 10. Upon injecting the burner-lance into an electric furnace (not shown) it may be desirable to first cut some of the scrap whereupon valves (not shown) will be opened to permit natural gas and oxygen to flow through passageways 22 and 20 respectively, where combustion will take place in the mixing chamber 18 for igniting an oxy-gas flame discharged out of nozzle 13, FIGS. 1 and 4. This oxy-gas flame is thus directed on the scrap where the scrap is cut and melted. This oxy-gas flame is utilized to aid the electrodes in melting the scrap. Where there may be a high electrical power factor imposing limitations, or for that matter a complete electrical power failure, the burner portion of the combination burner-lance can be used uninterruptedly to provide all the heat necessary to melt the metal with a uniform and maintained burning in temperature. By maintaining a uniform temperature the life expectancy of the refractory in the furnace is increased. It is conceivable, therefore, that if certain other conditions are satisfied in the furnace operation, direct impingement of the oxy-natural gas flame on the scrap results in faster melting of the scrap than by transferring heat to the scrap by radiation alone.

When the scrap has been pre-heated a length of time by the electrodes and/or the burner of the burner-lance in the electric furnace, a valve (not shown) controlling the flow of natural gas may be turned off to stop the flow of the natural gas, while utilizing only the oxygen through nozzle 13 for cutting the pre-heated scrap. Also, a valve (not shown) controlling the oxygen flow through nozzles 14 of the lance portion of the combination burner-lance may be opened to aid in cutting the pre-heated metal. The lance portion of the combination burner-lance provides a means of bringing oxygen onto the surface of an iron, steel or other metal melt, and by direct impingement, provides a means of decarbonizing or refining the melt.

It should be further pointed out that in electric furnaces there are areas in the furnace which are often called "cold spots." These areas are generally located outside of the immediate range of the electric arc. The use of a "traversing" burner-lance located in the door or at appropriate locations in the furnace shell permits access to these cold spots. Thus, the following advantages are obtained by using this process:

(1) A reduction in total heat or melting time.
(2) A definite increase in furnace production.
(3) A reduction in overall electrical power consumption.
(4) An increase in furnace availabilty.
(5) A reduction in electrode consumption.

Turning now to the utilization of the combination burner-lance 10 in an ordinary open hearth furnace (not shown), it can be injected from the back wall through a door or angled from the roof. Again, like in the electric furnace two or more burner-lances may be used depending upon the necessity. Unlike the electric furnace, the open hearth furnace requires the injection of a fuel in the form of tar, gases, oil or certain other ignitable materials to provide the necessary heat to melt the metal into a molten state. Thus, the combination burner-lance has the same advantages that when being utilized in an electrical furnace; namely, supplementing or substituting for some of the fuel required in the melting process. A cold metal operation benefit is derived by the burner portion of the combination burner-lance, because the burner oxy-gas flame can be used to increase the firing rate which is reflected in faster melting of the cold metal. For instance, each combination burner-lance utilized will permit a firing rate of at least 25 million B.t.u.'s per hour per burner, or 50 million B.t.u.'s per hour for two burners. The actual firing rate that is to be used is determined by the conditions existing during scrap meltdown.

Another factor of significance in using the combination burner-lance in an open hearth furnace is the increased refractory life due to shorter heat time. This has been a serious problem for some time, which is thus alleviated by the burner portion of the burner-lance for a reduction in total metal meltdown time. Still another significant advantage utilizing the oxy-natural gas portion of the burner-lance is that the additional heat developed with oxygen is directed down into the scrap rather than dissipated in the furnace.

In either an electric, open-hearth or other type of reverberatory furnace, the flexibility with which the combination burner-lance can be used is also another factor of significance. The combination burner-lance can be moved to desired locations, from various desired angles within the furnace together with easily accessible controls combined into an integral unit. Thus the operation takes place in direct contact with the metal being processed for a faster and more efficient operation.

In an open-hearth and other fuel type furnaces, through proper application of oxygen for refining purposes such as carbon reduction, it is possible to obtain: (1) Saving in ore addition. (2) Saving in total heat time. (3) Fuel savings. (4.) Longer refractory life due to shorter heat time. (5.) More direct control of the chemistry of the metal.

Figure 4:
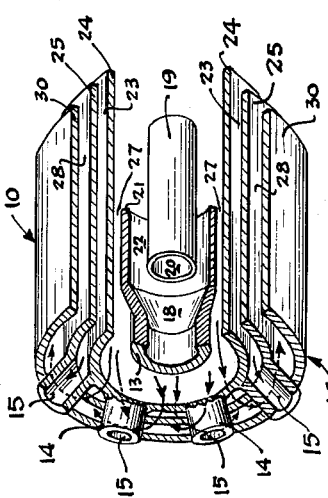
FIG. 4 is a fragmentary perspective view of an end portion of the injector with certain parts cut way to illustrate the various flow chambers and more particularly showing the cooling water circuit in the vicinity of the injector head.

It will be noticed from viewing FIG. 4 that the nozzles 14 are angled away from the central axis of the burner-lance 10, so that when the oxygen is discharged directly over the melt the oxygen is dispersed to cover a rather large surface area. This dispersed oxygen sets up a reaction in the molten metal for refining in a manner well known in the art. Being in direct contact with the melt surface, decarbonization or refining of the molten metal is thus faster than previous methods of injecting oxygen into the furnace melt because of the increased turbulence created by discharging oxygen at a high pressure against the melt surface. In addition, the oxygen alone may be discharged from nozzle 13 to further speed up the decarbonization process, which as noticed would be discharged against a surface area circumscribed by the surface area surrounded by the discharge of oxygen from nozzles 14. Thus, by providing two separate sources or supplies of oxygen, nozzle 14 and nozzle 13 can both be used to discharge oxygen for decarbonization or refining if so desirable.

If desired, the burner-lance can be introduced through the top opening of a common converter (not shown). The burner-lance serves two main or different purposes in the converter, namely;

(1) Burning in a refractory lining.
(2) Charging more scrap than heretofore known.

Heretofore, in the process of "burning in" a refractory lining of the converter, the converter is lined with a "green" or unburned refractory, and the bottom is covered with layers of coke, which are ignited, and by means of blowing oxygen onto the coke, the lining is burned in. By the injection of the burner-lance through the top opening in the converter, the burner portion is used to ignite the coke. Thereafter, the lance portion is utilized to increase the heat by blowing the oxygen under high pressure onto the burning coke and letting the heat burn in the lining. By this method the burning-in period is shortened considerably, because the burner portion permits faster and a more intense heat, while the lance portion can thereafter be used to replace the burner portion to accelerate the burning-in of the lining by blowing in oxygen.

The combination burner-lance can also be used to charge more scrap in the converter than heretofore known. The burner portion utilizing the oxy-gas flame is directed on the scrap metal in the converter for additionally preheating or melting the scrap. After the scrap has been melted down, the lance portion is used to blow in oxygen to take up the oxidation heat. Thus, the burner portion provides a fast heating time and the lance portion is used for refining the molten metal.

It should also become apparent that the burner arrangement disclosed could be a single entity in an injector, that is, minus the lance portion. Chambers 23 and 23' would then be employed to return water from chambers 27 and 27'. Nozzles 15 would be eliminated along with the fifth outer chambers 28 and 28'. In some instances, and more particularly for certain types of work desired in a furnace, the burner is sufficient. However, the novel arrangement of the burner portion disclosed in the combination burner-lance is vital for close work in the combustion area of the furnace for reasons pointed out above.

In describing the present burner-lance 10, oxygen inlet means are connected to central chamber 20 while natural gas inlet means are connected to second chamber 22' and ultimately to chamber 22. The same advantages herein described for the present burner-lance can be accomplished by reversing these connections so that the oxygen inlet means communicate with second chamber 22 and 22' and natural gas with central chamber 20. Likewise, the flow of cooling water can be reversed whereby water outlet 33 becomes an inlet and inlet 32 becomes an outlet.

Therefore, a combination burner-lance adapted for being injected at desired locations within a furnace has been described in which: the burner portion may be utilized to discharge an oxy-gas flame for simultaneously cutting and melting scrap metal, or utilized to discharge only oxygen for cutting pre-heated scrap and utilized in conjunction with the lance portion for aiding in decarbonization or refining molten metal after the scrap cutting and scrap melting operation; the lance portion may be utilized to discharge oxygen for aiding the burner portion in cutting pre-heated scrap metal but is primarily utilized for discharging oxygen and to create a turbulence in the molten metal to reduce carbon and otherwise refine the melt. Furthermore, a combination burner-lance has been described in which both the burner and lance portions each serve at least dual purposes and which may be in operation simultaneously within a furnace to aid each other in a single operation or as independent entities doing different operations simultanously, or operated independently to carry out independent operations.

While one specific and preferred form of the combination burner-lance for processing metal in a furnace has been illustrated and described, it will be understood that other forms will be suggested to those skilled in the art and that it is intended to include all such that do not depart from the spirit of this invention within its scope as best defined in the appended claims wherein there is claimed:

1. An apparatus for melting and refining scrap metals comprising, a body portion terminating in a head portion, said body portion defining five concentrically positioned chambers, an end wall in said head portion with a central passage defining a common nozzle in communication with the central chamber and the second concentric chamber, said common nozzle discharging gases in a downstream direction, means including a plurality of nozzles spaced around said common nozzle for discharging gases in divergent downstream directions and communicating with the fourth concentric chamber, passage means in said head portion and surrounding said nozzles to provide communication between the third and fifth chambers, spacing means to maintain said chambers in concentric arrangement and to close said chambers opposite said head portion, independent inlet means for gases communicating with said central chamber and with said second chamber, still another inlet means for oxygen in communication with said fourth chamber, and fluid coolant inlet and outlet means communicating with said third chamber and with said fifth outer chamber.

2. An apparatus for melting and refining scrap metals as defined in claim 1 wherein said body and said head are formed in separate portions.

3. An apparatus for melting and refining scrap metals as defined in claim 1 wherein said fourth chamber has an end wall spaced a short distance from said end wall of said head portion to provide said passage means between said third and fifth chambers and around said nozzles communicating with said fourth chamber.

4. An apparatus for melting and refining scrap metals as defined in claim 3 wherein said head portion defines a compartment adjacent said nozzle as an enlargement of said third concentric chamber.

5. An apparatus for melting and refining scrap metals as defined in claim 1 wherein said head portion has an annular, rearwardly tapering wall forming a divergent outlet for said central and second chambers.

6. An apparatus for melting and refining scrap metals as defined in claim 5 wherein the said outwardly angled nozzles are equidistantly spaced from each other and are angled away from the central axis of said combined burner and lance so as to discharge oxygen within a circumferential area with respect to the flow path of said common nozzle.

7. An apparatus for melting and refining scrap metals as defined in claim 5 wherein said common nozzle has a small diameter portion spaced from the end of said central chamber and a tapered wall portion extending from said small diameter portion to said second chamber to define a constricted flow path for the gases around the end of said central portion.

8. An apparatus for melting and refining scrap metals as defined in claim 7 wherein the end of said central chamber is placed substantially midway between said small diameter portion and the point where said tapered wall portion joins said second concentric chamber.

9. An apparatus for melting and refining scrap metals as defined in claim 8 wherein said independent gas inlet means include means to space said central and said second chambers concentrically from each other and further including sealing means disposed between the remaining chambers to maintain said chambers in concentric arrangement.

10. An apparatus for melting and refining scrap metals as defined in claim 9 wherein a first oxygen inlet means are connected to said central chamber and natural gas inlet means are connected to said second chamber at the ends of their respective chambers opposite said head portion and said respective connections of said coolant inlet and outlet means and the second said oxygen inlet means are made in a lateral manner.

11. An apparatus for melting and refining scrap metals comprising, a head portion, said head portion defining concentrically positioned chambers, an end wall in said head portion with a central passage defining a nozzle in communication with a first central chamber and a second concentric chamber, said nozzle discharging gases in a downstream direction, means including a plurality of nozzles spaced around said first mentioned nozzle for discharging gases in divergent downstream directions and communicating with a third concentric chamber, passage means in said head portion for supplying a coolant to cool said nozzles, sealing means to maintain said chambers in concentric arrangement and to close said chambers opposite said head portion, inlet means for gases communicating with said first and second concentric chambers, another inlet means for an oxidizing gas communicating with said third concentric chamber, and coolant inlet and outlet means communicating with said passage means in said head portion.

References Cited by the Examiner

UNITED STATES PATENTS

| | | | |
|---|---|---|---|
| 2,605,180 | 7/52 | Totzek | 266—41 X |
| 2,807,506 | 9/57 | Gehring | 158—73 X |
| 2,863,656 | 12/58 | Cox | 122—6.6 X |
| 2,971,578 | 2/61 | Davis | 158—109 |

FOREIGN PATENTS

| | | |
|---|---|---|
| 533,249 | 5/55 | Belgium. |
| 674,705 | 10/29 | France. |
| 1,226,560 | 2/60 | France. |

JAMES W. WESTHAVER, *Primary Examiner.*

FREDERICK L. MATTESON, Jr., *Examiner.*